United States Patent [19]
Mishima et al.

[11] Patent Number: 6,083,087
[45] Date of Patent: Jul. 4, 2000

[54] POWDER BEAM WORKING SYSTEM

[75] Inventors: Akio Mishima, Kanagawa; Koji Shimotoku, Chiba, both of Japan

[73] Assignee: Sony Corporation, Tokyo, Japan

[21] Appl. No.: 09/106,487

[22] Filed: Jun. 29, 1998

[30] Foreign Application Priority Data

Jun. 30, 1997 [JP] Japan .................................. 9-190591

[51] Int. Cl.[7] ............................. B24C 7/00; B24C 9/00
[52] U.S. Cl. ............................... 451/99; 451/87; 451/89; 451/446
[58] Field of Search ............................. 451/87, 88, 89, 451/99, 446

[56] References Cited

U.S. PATENT DOCUMENTS

| | | | |
|---|---|---|---|
| 3,834,082 | 9/1974 | Grudzinski | 451/99 |
| 4,048,757 | 9/1977 | Kubus et al. | 451/99 X |
| 4,707,951 | 11/1987 | Gibot et al. | 451/99 |
| 4,709,515 | 12/1987 | Copeland et al. | 451/99 |
| 4,970,830 | 11/1990 | Schlick | 451/99 |
| 5,097,633 | 3/1992 | Branton et al. | 451/99 X |
| 5,702,289 | 12/1997 | Champaigne | 451/99 X |

*Primary Examiner*—Timothy V. Eley
*Attorney, Agent, or Firm*—Hill & Simpson

[57] ABSTRACT

A powder beam working system for working a surface to be worked of an object to be worked by dispersing fine particles in high-pressure gas and projecting a solid-gas two-phase flow thus produced to the surface of the object to be worked which comprises means which temporarily stores the fine particles, a dispersing chamber which forms a portion of a flow path for the high-pressure gas and sending means which sends out the fine particles stored in the storing means into the dispersing chamber at a predetermined rate as the fine particles are in a solid phase state, thereby being capable of adjusting a flow rate of the produced solid-gas two-phase flow and an amount of the fine particles contained in the solid-gas two-phase flow easily and individually.

7 Claims, 8 Drawing Sheets

POWDER BEAM WORKING SYSTEM

BACKGROUND OF THE INVENTION

1. Field of the Invention

The present invention relates to a powder beam working system, and more specifically, to a powder beam working system being suitably applied to powder beam workings such as etching of a surface to be worked of a work (an object which is to be worked) by projecting a solid-gas two-phase flow which contains fine particles in particular to the surface to be worked.

2. Description of the Related Art

Figure 1:
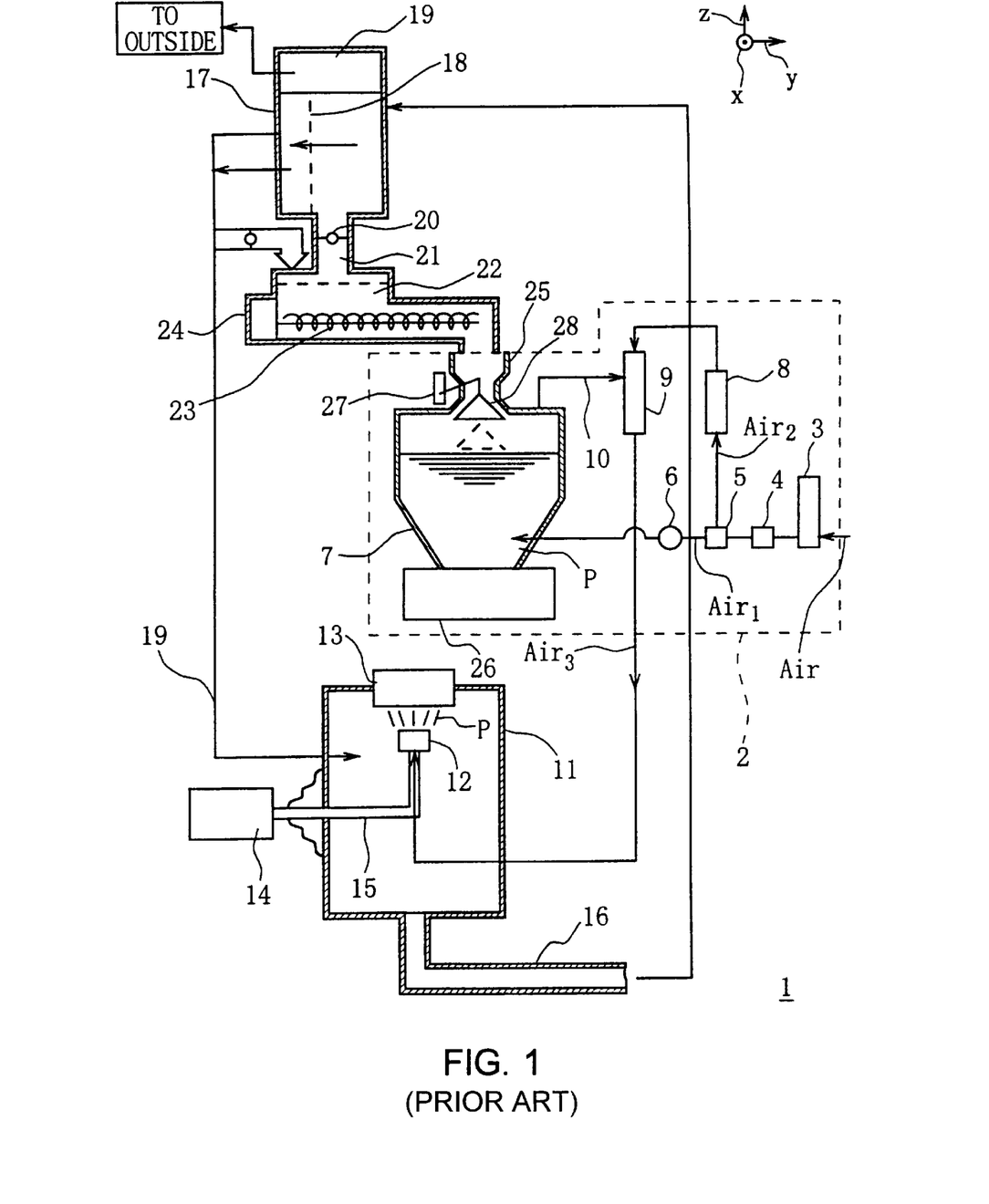
FIG. 1 is a schematic diagram illustrating a conventional powder beam working system.

There is conventionally known a powder beam working system of this kind which is configured as shown in FIG. 1.

In a powder beam working system 1 configured as shown in FIG. 1, supplied high-pressure air Air is dried in a dry unit 3 of a solid-gas two-phase flow producing section 2, input by way of a flow rate sensor 4 into a brancher 5 and branched, one obtained high-pressure air (hereinafter referred to as a first branched high-pressure air) $Air_1$ is given by way of a regulator 6 into a lower portion of a mixing tank 7 and the other high-pressure air (hereinafter referred to as a second branched high-pressure air) $Air_2$ is given by way of a flow rate controller 8 into an ejector 9.

Fine particles P, for example, of silicon carbide, alumina, glass or the like are accumulated in the mixing tank 7, blasted up by the first branched high-pressure air $Air_1$ which is supplied from the brancher 5 and supplied by way of a pipe 10 into the ejector 9 in a solid gas state (a condition where the particles are dispersed in the air).

The ejector 9 mixes the second high-pressure air $Air_2$ which is supplied from the flow rate controller 8 with the fine particles P which are supplied from the mixing tank 7 and sends a solid-gas two-phase flow $Air_3$ thus obtained under pressure by way of a pipe into a projecting nozzle 12 disposed in a working chamber 11. At this stage, a flow rate of the second branched high-pressure air $Air_2$ given to the ejector 9 is controlled by the flow rate controller 8 so that a flow rate of the solid-gas two-phase flow $Air_3$ sent under pressure into the projecting nozzle 12 is constant.

Accordingly, the powder beam working system 1 is capable of blasting the solid-gas two-phase flow $Air_3$ which is produced by the solid-gas two-phase producing section 2 by way of the projecting nozzle 12 to a surface to be worked of a work 13 which is set in a predetermined condition at a predetermined location in the working chamber 11. Thereby performing etching or a similar working of the surface to be worked of the work 13 with the fine particles P contained in the solid-gas two-phase flow $Air_3$.

The projecting nozzle 12 is fixed to a tip portion of an arm 15 which is coupled with an XY stage 14 so that it is freely movable in X and Y directions on the basis of propelling forces given in the X direction (indicated by an arrow x) and the Y direction (indicated by an arrow y) from the XY stage 14 by way of the arm 15. Accordingly, the powder beam working system 1 is capable of performing the powder beam working over the entire surface of the work 13.

On the other hand, the working chamber 11 is communicated with a separating chamber 17 by way of a pipe 16 and the solid-gas two-phase flow $Air_3$ which is projected from the projecting nozzle 12 is sent into the separating chamber 17 through the pipe 16. A portion of the solid-gas two-phase flow $Air_3$ which is sent into the separating chamber 17 is filtered by a primary filter 18 and then sent back into the working chamber 11 through a pipe 19, whereas the rest is further filtered by a secondary filter 19 which consists of a paper filter and then exhausted outside.

Further, the fine particles P which are separated from the solid-gas two-phase flow $Air_3$ by the primary filter 18 are sent by way of an openable communicating portion 21 into a storing chamber 22 by a butterfly valve 20.

Disposed in a lower portion of the storing chamber 22 is a screw 23, which is rotated on the basis of a rotating force given from a motor 24, thereby being capable of sending the fine particles P from the storing chamber 22 into the mixing tank 7 of the solid-gas two-phase flow producing section 2 by way of an isolator 25.

Accordingly, the powder beam working system 1 is capable of returning the fine particles P which are used for powder beam working again into the mixing tank 7 sequentially by way of the working chamber 11, the separating chamber 17 and the storing chamber 22, thereby being capable of efficiently using the fine particles P.

In the powder beam working system 1, disposed under the mixing tank 7 is an electronic balance 26 for measuring weight of the fine particles P accumulated in the mixing tank 7 and arranged in an upper portion of the mixing tank 7 is a triangular valve 28 which goes up and down on the basis of propelling forces given from a driving mechanism 27, thereby being capable of opening and closing an inlet port of the mixing tank 7.

Accordingly, the powder beam working system 1 is capable of mechanically separating the storing chamber 22 and the mixing tank 7 from each other with the triangular valve 28. Thereby being capable of sending out the fine particles P always at a constant rate into the ejector 9 while accurately measuring weight of the fine particles P accumulated in the mixing tank 7 with the electronic balance 26.

When it is desired to slightly work the surface to be worked of the work 13 in the powder beam working system 1 having the configuration described above, for example, it is sufficient to reduce a flow rate of the solid-gas two-phase flow $Air_3$ projected from the projecting nozzle 12 so that the fine particles P which have low kinetic energies collide with the surface to be worked of the work 13.

In order to enhance a working rate in this case, it is sufficient to allow the solid-gas two-phase flow $Air_3$ to contain the fine particles P in a number as large as possible and it is sufficient in this case to supply the first branched high-pressure air $Air_1$ at a rate as high as possible into the mixing tank 7.

However, a flow rate of the solid-gas two-phase flow $Air_3$ projected from the projecting nozzle 12 and a number of the fine particles P contained in the solid-gas two-phase flow $Air_3$ cannot be adjusted individually in the powder beam working system 1 having the configuration described above, wherein the supplied high-pressure air Air is branched by the brancher 5, the fine particles P accumulated in the mixing tank 7 are blasted up by the first branched high-pressure air $Air_1$ thus obtained and the solid-gas two-phase flow $Air_3$ is produced by mixing the fine particles P with the second branched high-pressure air $Air_2$.

Accordingly, the powder beam working system 1 is incapable of allowing the solid-gas two-phase flow $Air_3$ to contain the fine particles P in a number as large as possible while suppressing a flow rate of the solid-gas two-phase flow $Air_3$, thereby posing a problem that it is incapable of coping with use for various kinds of powder beam workings such as the slight working of the surface to be worked of the work 13 at a high working rate.

When a flow rate of the first branched high-pressure air $Air_1$ to be supplied into the mixing tank 7 is enhanced to allow the solid-gas two-phase flow $Air_3$ to contain the fine particles P in a number as large as possible (i.e., to enhance a working rate) in the powder beam working system 1 which has the configuration described above, it poses another problem that lumps of the fine particles P (hereinafter referred to as powder balls) are produced and blasted to the surface to be worked of the work 13 by way of the second branched high-pressure air $Air_2$ in the ejector 9 and the projecting nozzle 12, thereby producing adverse influences not only on the suppression of fine particles projected from the projecting nozzle 12 but also on the work 13 itself.

SUMMARY OF THE INVENTION

In view of the foregoing, an object of this invention is to provide a powder beam working system in which, various kinds of powder beam workings can be performed.

The foregoing object and other objects of the invention have been achieved by the provision of a powder beam working system which comprises sending means to send out fine particles stored in storing means into a dispersing chamber consisting of a flow path for the high-pressure gas at a predetermined rate as they are in a solid phase state.

As a result, the powder beam working system according to the present invention is capable of adjusting a flow rate of a solid-gas two-phase flow and an amount of fine particles contained in the solid-gas two-phase flow independently.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 2:
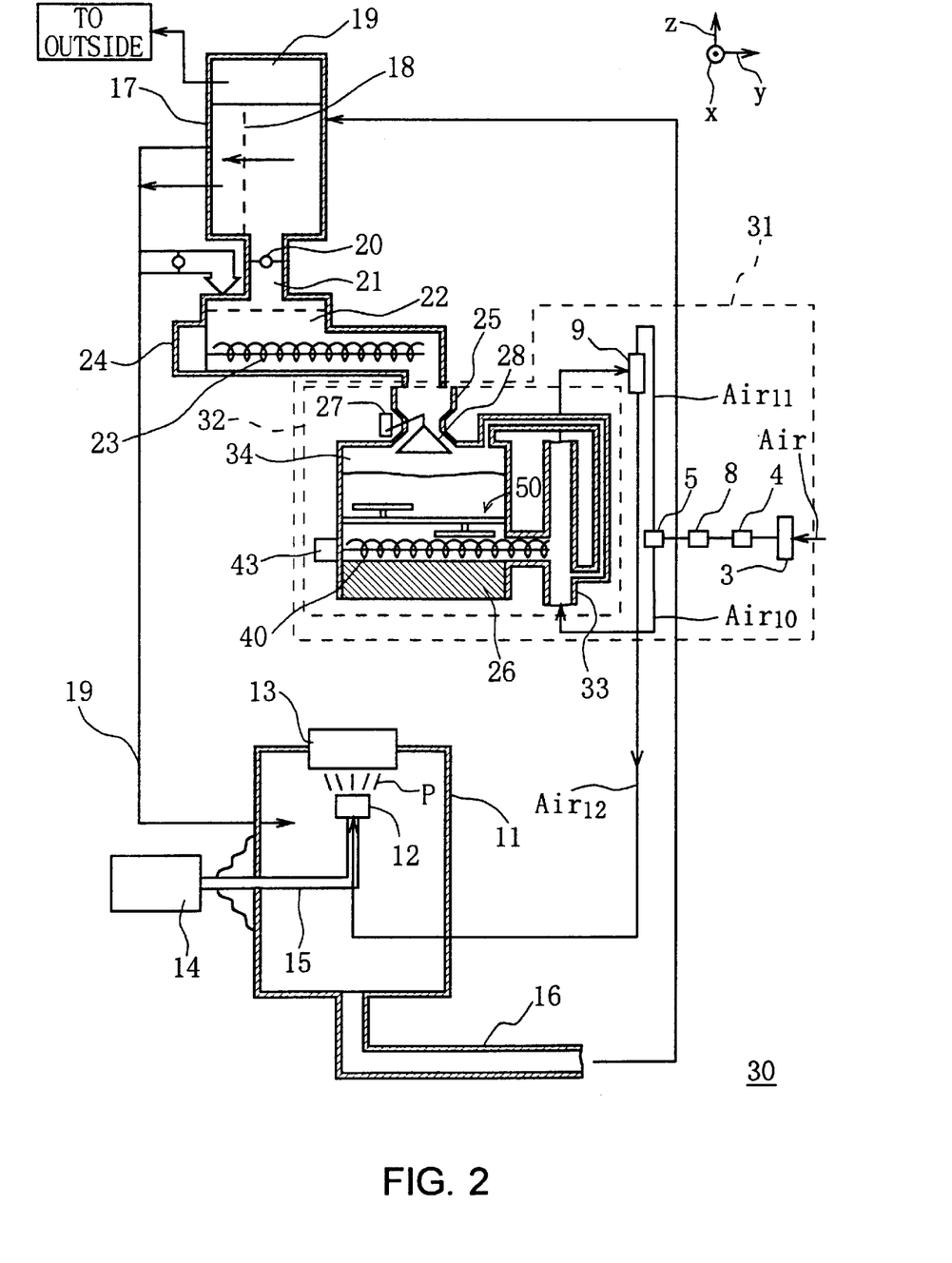
FIG. 2 is a schematic diagram showing a configuration of a first embodiment of the powder beam working system according to the present invention.

Preferred embodiment of this invention will be described with reference to the accompanying drawings:

In FIG. 2 wherein members corresponding to those shown in FIG. 1 are represented by the same reference numerals, a reference numeral 30 represents a powder beam working system according to the present invention as a whole, which is configured similarly to the powder beam working system 1 (FIG. 1), except for a solid-gas two-phase flow producing section 31 which is configured differently.

In case of the powder beam working system 30, high-pressure air Air supplied to the solid-gas two-phase flow producing section 31 is input into a brancher 5 sequentially by way of a dry unit 3, a flow rate sensor 4 and a flow rate controller 8 and branched by the brancher 5, a first branched high-pressure air $Air_{10}$ is sent into a dispersing chamber 33 of a mixing section 32, and a second high-pressure air $Air_{11}$ is sent into an ejector 9.

Figure 3A:
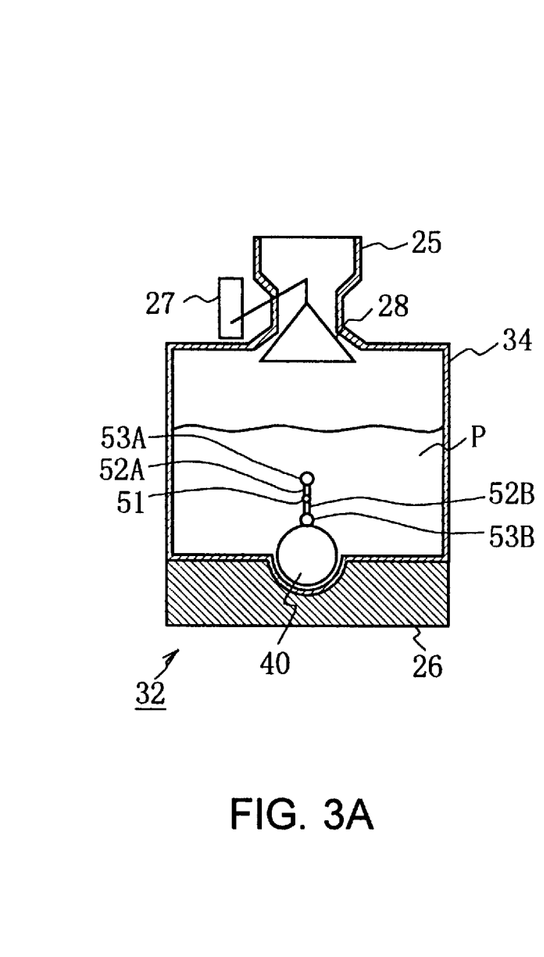
FIGS. 3A and 3B are schematic end surface views illustrating a configuration of a mixing section in the first embodiment.
Figure 3B:
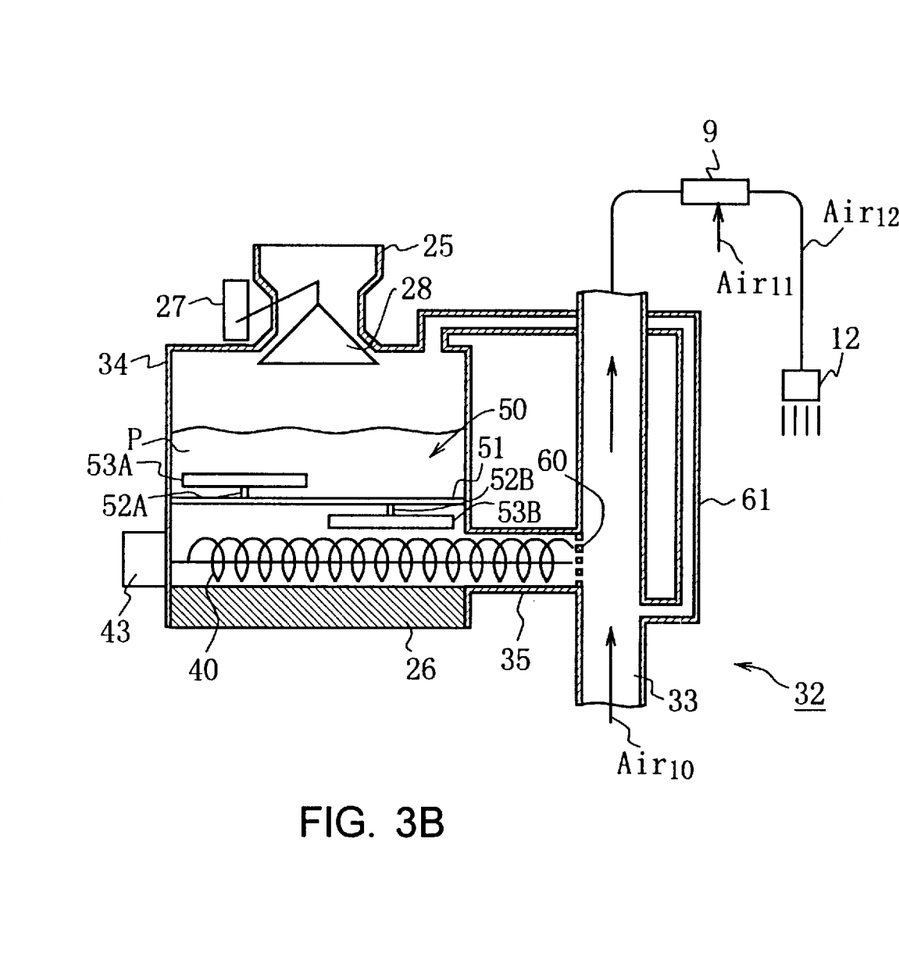

The mixing section 32 is composed by communicating a vessel 34 in which fine particles P are accumulated, by way of a communicator 35, with the dispersing chamber 33 consisting of a portion of a flow path for the first branched high-pressure air $Air_{10}$ which communicates the brancher 5 with the ejector 9 and a screw 40 is disposed in a lower portion of the vessel 34 as shown in FIGS. 3A and 3B.

Figure 4:
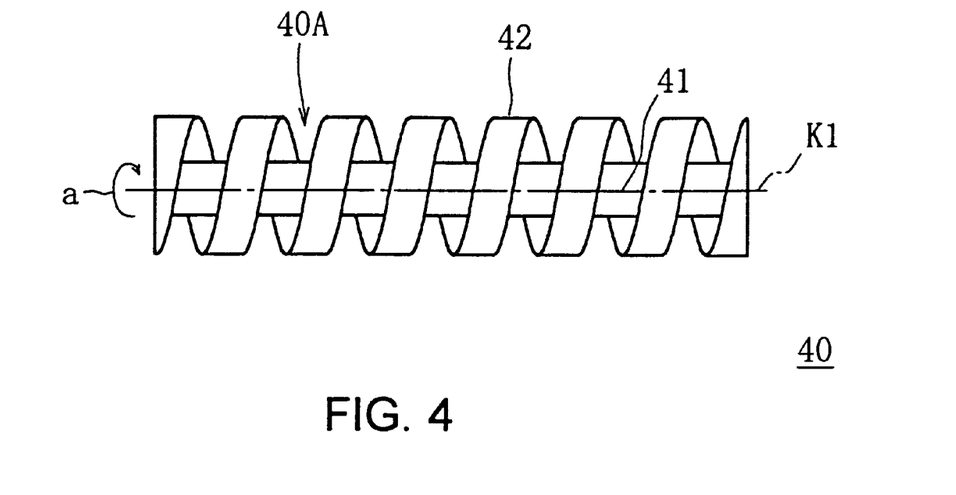
FIG. 4 is a side view illustrating a configuration of a screw.

In this case, the screw 40 is formed by winding a second rod member 42 having a rectangular sectional shape around an outer circumferential surface of a first rod member 41 having a circular sectional shape at a predetermined pitch so that the screw 40 as a whole has a cylindrical form which has a spiral groove 40A on an outer circumferential surface thereof as shown in FIG. 4.

Further, the screw 40 is rotatable around a center axis K1 thereof in a direction indicated by an arrow a on the basis of a rotating force which is output from a motor 43 fixed to the vessel 34 (FIG. 2).

Accordingly, the powder beam working system 30 is capable of sending out the fine particles P which have penetrated in the groove 40A of the screw 40 into the dispersing chamber 33 at a constant rate corresponding to a rotating speed of the screw 40 as they are in a solid phase state (in a condition where the fine particles are accumulated in the vessel 34 without being dispersed in air) by driving the motor 43 so as to rotate the screw 40 at a constant speed in the direction indicated by the arrow a.

The fine particles P which are sent into the dispersing chamber 33 are dispersed in the first branched high-pressure air $Air_{10}$ flowing through the dispersing chamber 33, and the first branched high-pressure air $Air_{10}$ is mixed with the second branched high-pressure air $Air_{11}$ in the ejector 9 and accelerated, whereby a solid-gas two-phase flow $Air_{12}$ is produced and sent under pressure into a projecting nozzle 12.

Accordingly, the powder beam working system 30 is capable of blasting the solid-gas two-phase flow $Air_{12}$ which contains the fine particles P in an amount corresponding to the rotating speed of the screw 40 of the mixing section 32 by way of the projecting nozzle 12 to the surface to be worked of a work 13 which is fixed in a working chamber 11 (FIG. 2), thereby being capable of performing the powder beam working of the surface to be worked of the work 13 with the solid-gas two-phase flow $Air_{12}$.

In the first embodiment, an agitating frame 50 which agitates the fine particles P in the vessel 34 is disposed in the vessel 34 of the mixing section 32.

As apparent from FIGS. 3A and 3B, the agitating frame 50 actually has a rotating shaft 51 which is disposed approximately in parallel with the screw 40 and rotatable, and a first and second agitator members 53A and 53B in a rod-like shape are attached to the rotating shaft 51 by way of support rods 52A and 52B respectively at locations symmetrical with regard to a center of gravity of the rotating shaft 51.

Further, the agitating frame 50 is interlocked with the screw 40 so that they rotate in synchronization around the center axis of the rotating shaft 51 on the basis of the rotating output from the motor 43, and it is preferable that the first and second agitating members 53A and 53B are arranged so that their outer circumferential surfaces can be brought into contact with an outer circumferential surface of the screw 40.

Accordingly, the powder beam working system 30 is capable of dropping the fine particles P accumulated in the vessel 34 of the mixing section 32, those located around the screw 40 in particular, into the groove 40A of the screw 40 by agitating them with the first and second agitating members 53A and 53B of the agitating frame 50, and supplying the fine particles P into the groove 40A of the screw 40 always at a definite rate by rubbing the outer circumferential surface of the screw 40 with the first and second agitating member 53A and 53B, whereby the powder beam working system 30 is capable of sending out the fine particles P into the dispersing chamber 33 always at a definite rate when rotating the screw 40 at the definite speed.

Figure 5:
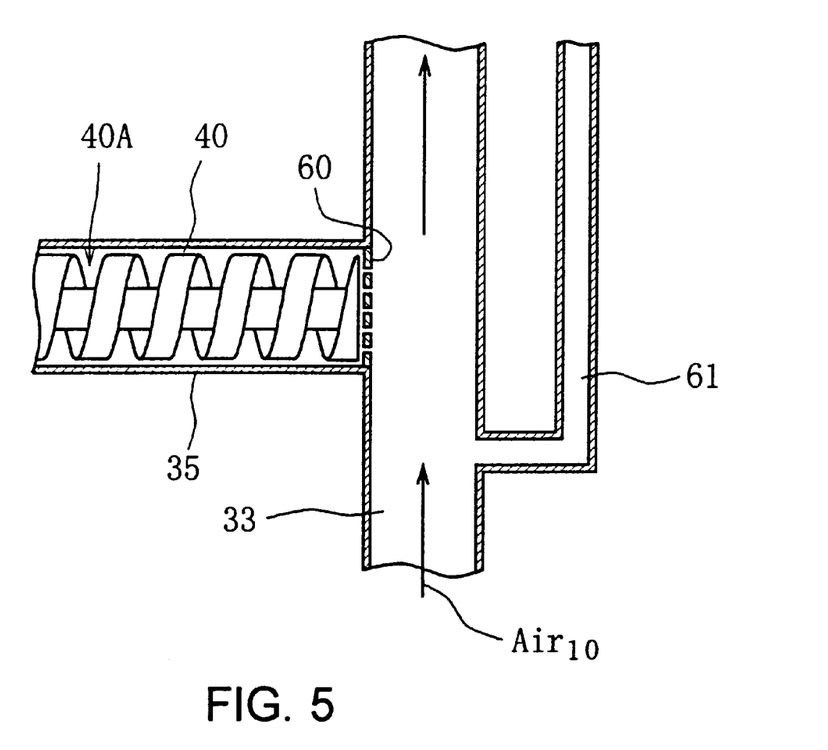
FIG. 5 is a schematic end surface view illustrating a vicinity of an open end of a communicating portion on a side of a dispersing chamber in the first embodiment.

In the first embodiment, a metal wire net 60 which has open meshes, for example on the order of 2- to 3-mm square, is disposed in an open end of the communicating portion 35 on a side of the dispersing chamber 33 (hereinafter referred to as dispersing chamber side open end) as shown in FIG. 5.

Accordingly, the powder beam working system 30 is capable of fractionizing lumps of the fine particles P to be sent by the screw 40 into the dispersing chamber 33 of the mixing section 32 by passing them through this metal wire net 60, thereby being capable of dispersing the fine particles P more securely into the first branched high-pressure air $Air_{10}$ in the dispersing chamber 33.

In the first embodiment, a bypass 61 is formed in the mixing section 32 so that a location which is slightly upstream the position where the dispersing chamber 33 is communicated with the communicating portion 35 in the flow of the first branched high-pressure air $Air_{10}$ is communicated with an upper portion of the vessel 34 as apparent from FIG. 3B in particular.

Accordingly, the powder beam working system 30 is capable of nearly equalizing a pressure in the dispersing chamber side open end of the communicating portion 35 with an internal pressure of the vessel 34, thereby being capable of preventing the first branched high-pressure air $Air_{10}$ which flows through the dispersing chamber 33 from flowing into the vessel 34 by way of the communicating portion 35.

Figure 6:
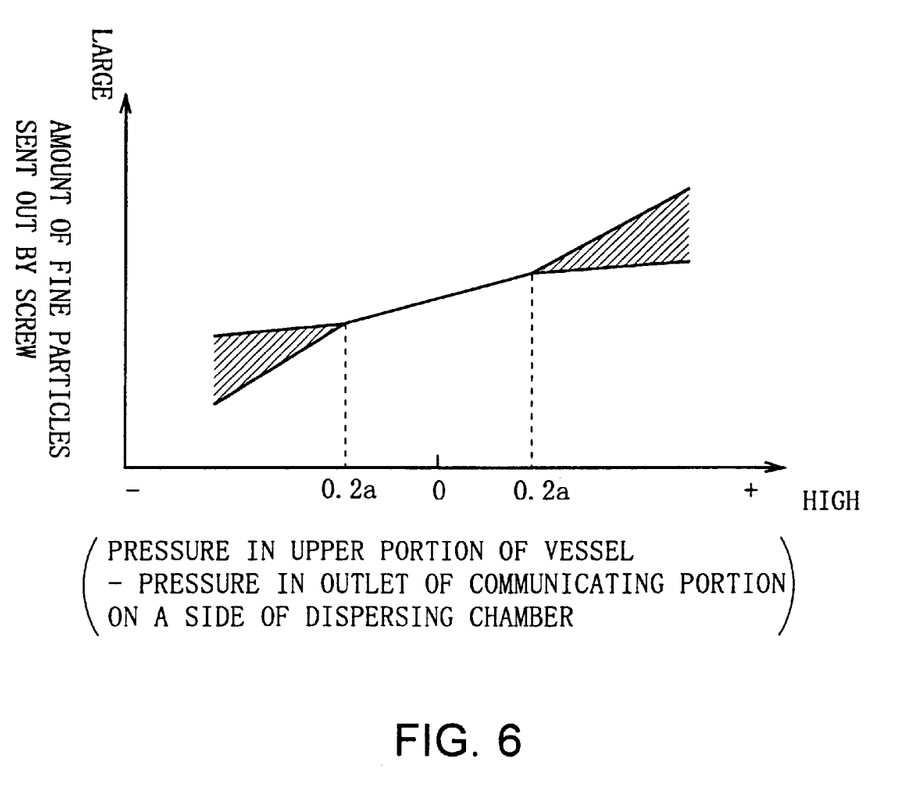
FIG. 6 is a characteristic curve descriptive of an amount of fine particles sent out into the dispersing chamber by the screw which is variable due to a difference between an internal pressure of a vessel and a pressure at the open end of the communicating portion on the side of the dispersing chamber.

A relation of a difference between a pressure in the upper internal portion of the mixing section 32 and a pressure in the dispersing chamber side open end of the communicating portion 35 versus a number of the fine particles P which were sent into the dispersing chamber 33 by the screw 40 was actually checked as shown in FIG. 6. When the pressure in the dispersing chamber side open end of the communicating portion 35 was represented by a $kgf/cm^2$ and the pressure in the upper internal portion of the vessel 34 of the mixing section 32 was designated by b, experiments indicated that it is possible to prevent the fine particles P in the groove 40A of the screw 40 from being pushed backward into the vessel 34 under a pressure of the first branched high-pressure air $Air_{10}$ by adjusting the pressure b in the upper internal portion of the vessel 34 of the mixing section 32 so as to satisfy the following equation:

$$0.8 \times a \leq b \leq 1.2 \times a \quad (1)$$

Areas which are slashed in FIG. 6 represent regions in which an amount of fine particles P which are sent back into the dispersing chamber 33 by the screw 40 varies.

Accordingly, the powder beam working system 30 in which the bypass 61 is formed as described above is capable of sending out, as the screw 40 rotates, the fine particles P into the dispersing chamber 33 at a definite rate corresponding to a rotating speed of the screw 40, thereby allowing the projecting nozzle 12 to project the solid-gas two-phase flow $Air_{12}$ which contains the fine particles P at a predetermined rate corresponding to the rotating speed of the screw 40.

In the powder beam working system 30 which has the configuration described above, the supplied high-pressure air Air is input into the brancher 5 by way of the flow rate controller 8 and branched by the brancher 5, and the first branched high-pressure air $Air_{10}$ is led into the dispersing chamber 33 of the mixing section 32.

By sending out the fine particles P which are accumulated in the vessel 34 of the mixing section 32 into the dispersing chamber 33 at the predetermined rate with the screw 40 as they are in the solid phase state while measuring weight of the fine particles P with an electronic balance 26, the fine particles P are dispersed into the first high-pressure air $Air_{10}$ in the dispersing chamber 33, then the solid-gas two-phase flow $Air_{12}$ is produced by mixing the first branched high-pressure air $Air_{10}$ with the other second branched high-pressure air $Air_{11}$ which is obtained by the brancher 5 in the ejector 9 and the solid-gas two-phase flow air $Air_{12}$ is projected by way of the projecting nozzle 12.

Accordingly, the powder beam working system 30 is capable of adjusting a flow rate of the solid-gas two-phase flow $Air_{12}$ and an amount of the fine particles P contained in the solid-gas two-phase flow $Air_{12}$ individually since it is capable of controlling a flow rate of the solid-gas two-phase flow $Air_{12}$ projected from the projecting nozzle 12 with the flow rate controller 8 and controlling an amount of the fine particles P to be contained in the solid-gas two-phase flow $Air_{12}$ by adjusting a rotating speed of the screw 40 in the mixing section 32.

Further, the powder beam working system 30 is capable of dispersing the fine particles P more uniformly in the first branched high-pressure air $Air_{10}$ and preventing powder balls from being produced since it is configured to fractionize, with the metal wire net 60, lumps of the solid-state fine particles P to be sent into the dispersing chamber 33 by the screw 40 in the mixing section 32.

The first embodiment which has the configuration described above is capable of adjusting a flow rate of the solid-gas two-phase flow $Air_{12}$ projected from the projecting nozzle 12 and an amount of the fine particles P contained in the solid-gas two-phase flow $Air_{12}$ individually since it is configured to produce the solid-gas two-phase flow $Air_{12}$ by sending out the fine particles P into the flow path of the first branched high-pressure air $Air_{10}$ using the screw 40 which is driven by the motor 43 and dispersing the fine particles as they are in the solid phase state. Accordingly, the first embodiment makes it possible to provide a powder beam working system which is capable of allowing the solid-gas two-phase flow $Air_{12}$ to be projected from the projecting nozzle 12 in various modes, thereby being capable of coping with various power beam workings.

A second embodiment is described in detail as follows.

Figure 7A:
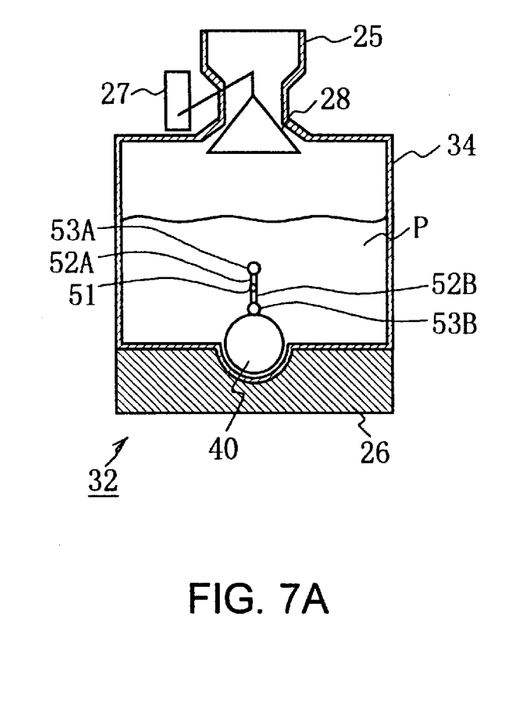
FIGS. 7A and 7B are schematic diagrams illustrating a configuration of a mixing section in a second embodiment.
Figure 7B:
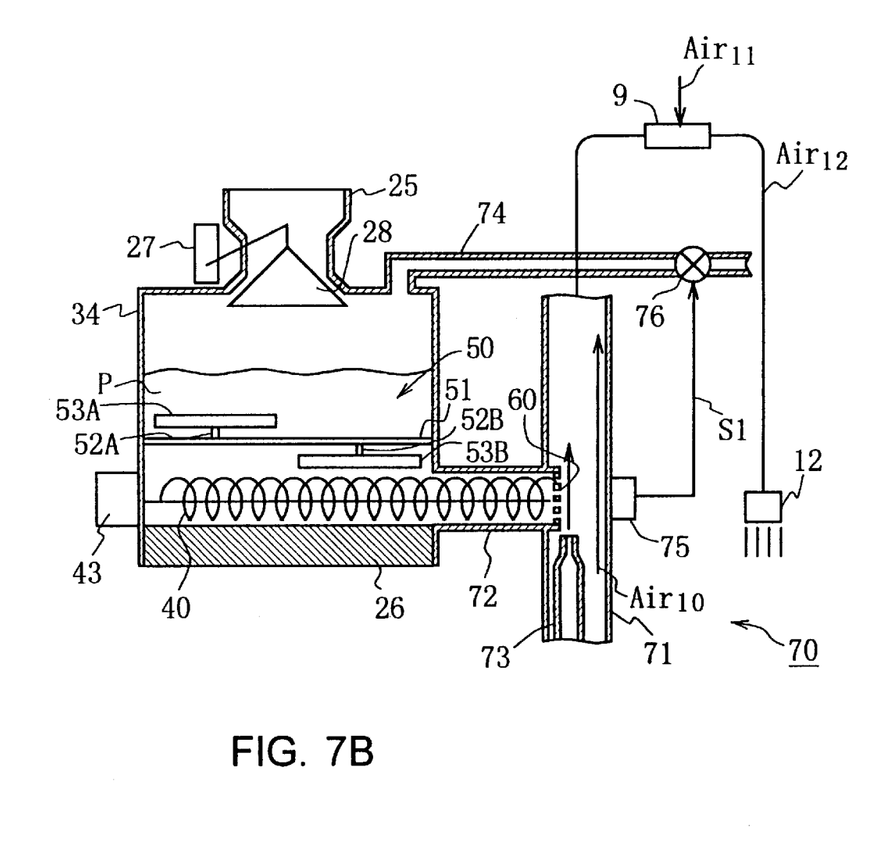

FIGS. 7A and 7B in which members corresponding to those shown in FIGS. 3A and 3B are represented by the same reference numerals illustrate a mixing section 70 used in the second embodiment which is adopted in place of the mixing section 32 of the powder beam working system 30 shown in FIG. 2. In the mixing section 70, a dispersing chamber side open end of a communicating portion 72 which communicates a vessel 34 with a dispersing chamber 71 is formed so as to protrude to a middle portion of the dispersing chamber 71.

Further, a tapered nozzle 73 is disposed in the dispersing chamber 71 so that it is positioned in parallel with a flow direction of a first branched high-pressure air $Air_{10}$ and locates its tip in opposition to a tip of the communicating portion 72.

In this mixing section 70, the nozzle 73 is capable of compressing the first branched high-pressure air $Air_{10}$ flowing through the dispersing chamber 71 and projecting it to the tip of the communicating portion 72, thereby allowing the fine particles P in a solid phase state sent into the dispersing chamber 71 by a screw 40 from the tip of the communicating portion 72 to be dispersed more securely in the first branched high-pressure air $Air_{10}$ with the first branched high-pressure air $Air_{10}$ which is compressed and output from the tip portion of the nozzle 73.

In the second embodiment, an upper internal portion of the vessel 34 is connected to a high-pressure air source (not shown) by way of a pipe 74 and a pressure sensor 75 is attached to the dispersing chamber 71 so as to be capable of measuring a pressure in an outlet of the communicating portion 72 which is located on a side of the dispersing chamber 71.

The pressure sensor 75 sends a pressure measured in the vicinity of the dispersing chamber side open end of the communicating portion 72 as a pressure detection signal S1 to a sferics valve 76 provided on the way through the pipe 74. The sferics valve 76 controls, on the basis of the pressure detection signal S1, a rate of the high-pressure air flowing through the pipe 74 so that an internal pressure of the upper portion of the vessel 34 is equal to the pressure in the vicinity of the dispersing chamber side open end of the communicating chamber 72.

Accordingly, the mixing chamber 70 is capable of controlling the internal pressure of the upper portion of the vessel 34 so as to be nearly equal to the pressure in the vicinity of the dispersing chamber side open end of the communicating portion 72. Thereby being capable of sending out, as the screw 40 rotates, the fine particles P into the dispersing chamber 71 always at a definite rate corresponding to a rotating speed of the screw 40 as described above with reference to FIG. 6.

The second embodiment which has the configuration described above is capable of dispersing the fine particles P which are sent into the dispersing chamber 71 by the screw 40 more securely into the first branched high-pressure air $Air_{10}$ since the tapered nozzle 73 is disposed in the dispersing chamber 71 so as to be in parallel with the flow direction of the first branched high-pressure air $Air_{10}$ and locate its tip opposed to the tip of the communicating portion 72. Accordingly, the second embodiment is capable of dispersing a larger number of the fine particles P in the first branched high-pressure air $Air_{10}$ which is a thin flow. Making it possible to provide a powder beam working system which is capable of projecting the solid-gas two-phase flow $Air_{12}$ from the projecting nozzle 12 in various modes and therefore coping with various kinds of power beam workings.

The following detailed description deals with other embodiments.

Though the solid-gas two-phase flow is produced by dispersing the fine particles P in the high-pressure air Air in the first or second embodiment described above, the present invention is not limited by this solid-gas two-phase flow and a solid-gas two-phase flow may be produced by dispersing fine particles P in one of other various kinds of high-pressure gaseous body.

Though the vessel 34 which has the form shown in FIGS. 3A or 3B is used as the means for temporarily storing the fine particles P in the first or second embodiment described above, the present invention is not limited by this form and the means for temporarily storing the fine particles P may have one of other various forms.

Though the dispersing chamber 33 or 71 which forms a portion of the flow path for the first branched high-pressure air $Air_{10}$ has the form shown in FIGS. 3 or 7 in the first or second embodiment described above, the present invention is not limited by this form and the dispersing chamber may have one of other various forms.

Though the means for sending out the fine particles P accumulated in the vessel 34 of the mixing section 32 or 70 to the dispersing chamber 33 or 71 as they are in the solid phase state is composed of the screw 40 as shown in FIG. 4 and the motor 43 in the first or second embodiment described above, the present invention is not limited by this configuration and the sending means may have one of other various configurations so far as it is capable of sending the fine particles P accumulated in the vessel 34 into the dispersing chamber 33 or 71 at a definite rate.

Though the metal wire net 60 which has the open meshes on the order of 2- to 3-mm square is used as the means for fractionizing the solid-state fine particles P to be sent into the dispersing chamber 33 or 71 of the mixing section 32 or 70 in the first or second embodiment described above, the present invention is not limited by this metal wire net and any one of other various means is usable as the fractionizing means so far as it is capable of fractionizing lumps of the fine particles P to be sent into the dispersing chamber 33 or 71 of the mixing section 32 or 70.

Figure 8:
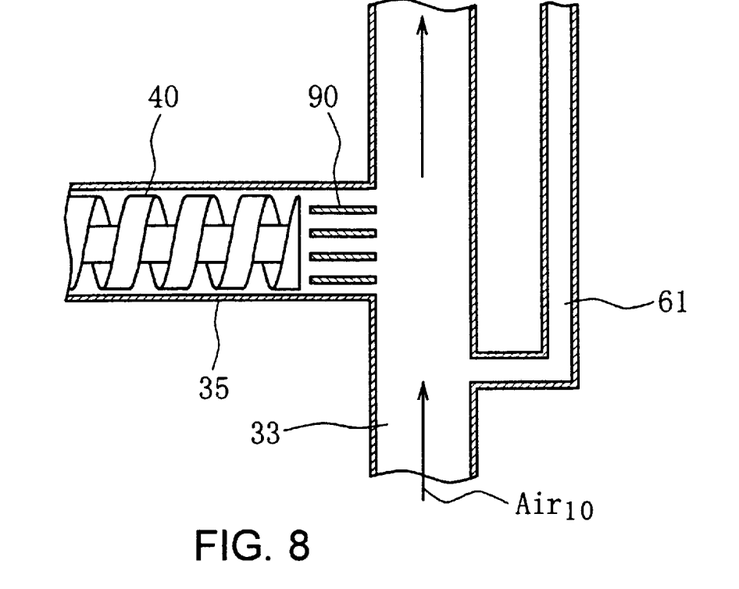
FIG. 8 is a schematic end surface view descriptive of another embodiment.
Figure 9:
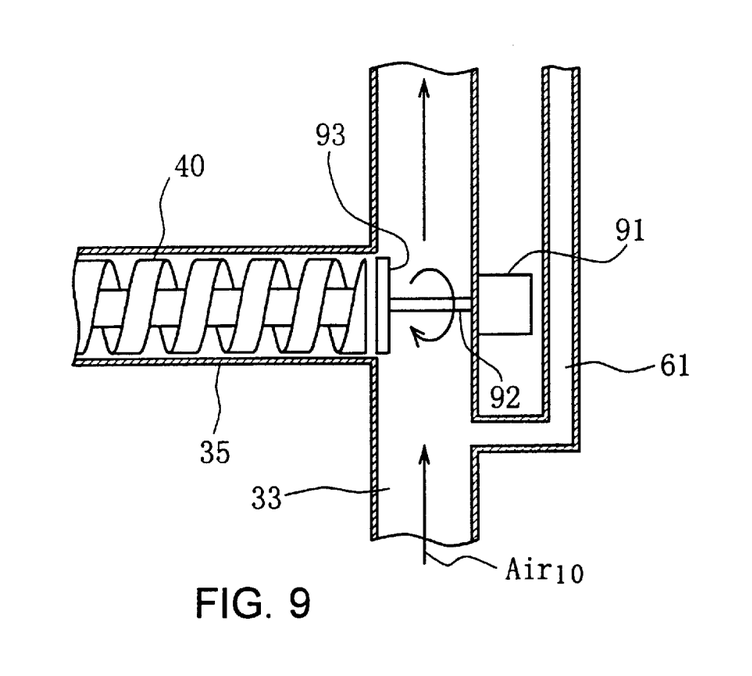
FIG. 9 is a schematic end surface view descriptive of still another embodiment.

A honeycomb-like net such as that shown in FIG. 8, for example, may be used as fractionizing means in place of the metal wire net 60 or it is possible, for example, as shown in FIG. 9, to compose fractionizing means of a motor 91 which is disposed in opposition to the outlet of the communicating portion 35 on the side of the dispersing chamber 33 and a blade 93 which is attached to a tip portion of an output shaft 92 of the motor 91 so that the solid-state fine particles P which are sent into the dispersing chamber 33 or 71 by the screw 40 are scratched little by little with the blade 93 and dispersed in the first branched high-pressure air $Air_{10}$.

Figure 10A:
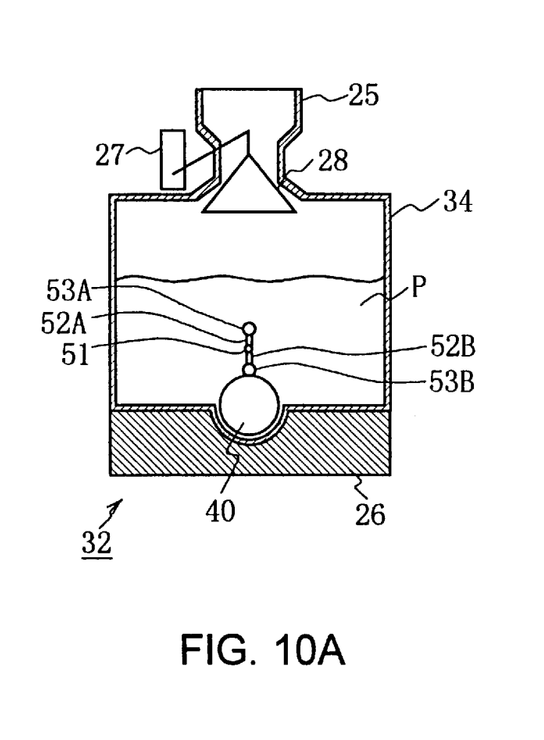
FIGS. 10A and 10B are schematic end surface views descriptive of further another embodiment.
Figure 10B:
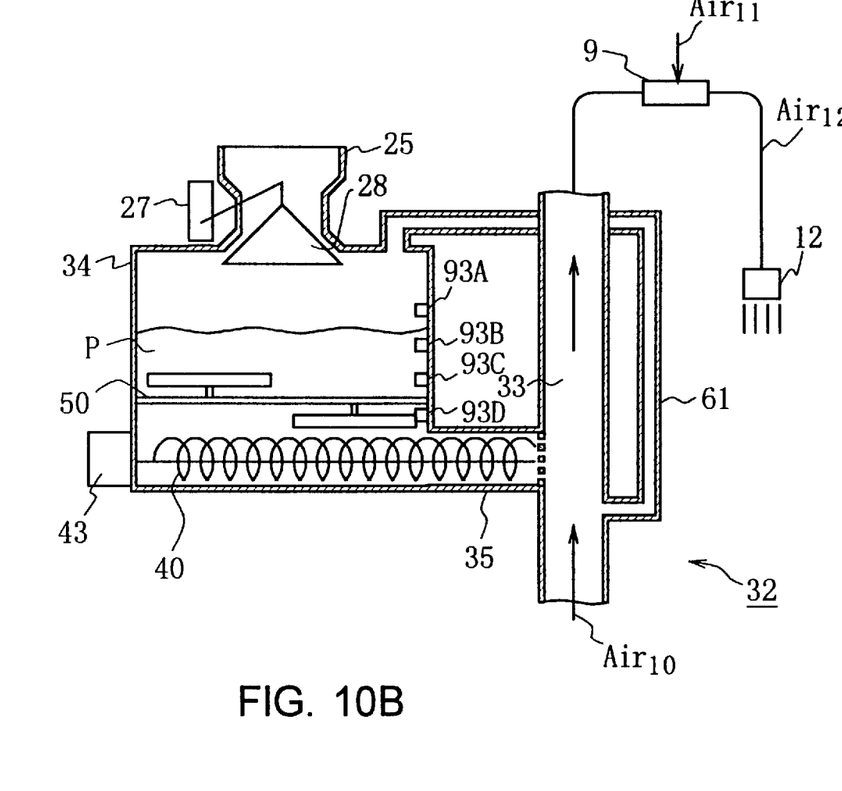

Though the fine particles P which are accumulated in the vessel 34 of the mixing section 32 or 70 are sent at the definite rate into the dispersing chamber 33 or 71 by the screw 40 while measuring the weight of the fine particles P with the electronic balance 26 and controlling the motor 43 in the first or second embodiment described above, the present invention is not limited by this configuration and it is possible, for example, to dispose a plurality of bimorph type sensors 93A through 93D in the vessel 34 in a direction of a height thereof at a predetermined pitch as shown in FIGS. 10A and 10B and measure an amount of the fine particles P accumulated in the vessel 34 on the basis of outputs from these sensors 93A through 93D.

Though the bypass 61 which communicates the dispersing chamber 33 with the vessel 34 is adopted as the control means which controls the internal pressure of the vessel 34 so as to be equal or nearly equal to the pressure in the dispersing chamber 33 in the vicinity of the dispersing chamber side open end of the communicating portion 34 of the mixing section 32 in the first embodiment described above. And though the pressure sensor 75 and the sferics valve 76 are adopted as the control means which controls the internal pressure of the vessel 34 so as to be equal or nearly equal to the pressure in the dispersing chamber 71 in the vicinity of the dispersing chamber side open end of the communicating portion 72 of the mixing section 70 in the second embodiment described above. The present invention is not limited by these configurations and the control means can adopt other various configurations.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A powder beam working system for dispersing fine particles in high-pressure gas and projecting a resultant solid-gas two-phase flow on a surface of an object to be worked so as to work the surface of the object to be worked, said powder beam working system comprising:

storing means for temporarily storing said fine particles;

a dispersing chamber for forming a portion of a flow path for said high-pressure gas;

sending means for sending fine particles stored in said storing means into said dispersing chamber in their solid phase state at a predetermined rate to form a first stream of particles;

ejecting means for combining the first stream with a second portion of the flow path to form the solid-gas two-phase flow; and control means for controlling an internal pressure of said storing means so as to be equal or almost equal to a pressure in said dispersing chamber.

2. A powder beam working system according to claim 1, comprising said control means is formed by a bypass from said dispersing chamber to said storing means.

3. A powder beam working system according to claim 1, comprising fractionizing means for fractionizing lumps of said fine particles to be sent into said dispersing chamber.

4. A powder beam working system according to claim 1, wherein the sending means comprises a rotatable screw discharging through a discharge opening into said dispersing chamber.

5. A powder beam working system according to claim 4 comprising fractionizing means for fractionizing lumps of said fine particles to be sent into said dispersing chamber.

6. A powder beam working system according to claim 5, wherein the fractionizing means comprises a screen being disposed in the discharge opening.

7. A powder beam working system according to claim 5, wherein said fractionizing means comprises a blade disposed at said discharge opening and means for rotating said blade.

* * * * *